United States Patent [19]

Ollivier

[11] Patent Number: 4,702,277

[45] Date of Patent: Oct. 27, 1987

[54] CYLINDER VALVE-REGULATOR

[75] Inventor: Louis A. Ollivier, Palo Alto, Calif.

[73] Assignee: Veriflo Corporation, Richmond, Calif.

[21] Appl. No.: 937,461

[22] Filed: Dec. 2, 1986

Related U.S. Application Data

[63] Continuation of Ser. No. 729,414, May 1, 1985, abandoned.

[51] Int. Cl.⁴ .......... F16K 31/122

[52] U.S. Cl. .......... 137/613; 137/488; 137/492.5; 137/510; 137/505.41; 137/906; 251/63.4; 251/63.5; 251/118; 251/149.6

[58] Field of Search .......... 137/485, 488, 489.5, 137/492, 492.5, 613, 614.2, 509, 510, 881, 883, 505.14, 505.42; 251/62, 63.4, 63.5; 222/3, 399; 92/63

[56] References Cited

U.S. PATENT DOCUMENTS

| | | | |
|---|---|---|---|
| 1,300,982 | 4/1919 | Lodge . | |
| 1,460,900 | 4/1922 | Harris et al. . | |
| 1,528,074 | 10/1922 | Ralston . | |
| 2,212,709 | 8/1940 | Grove | 137/505.42 |
| 2,344,740 | 3/1944 | Shaff | 251/149.6 X |
| 2,589,426 | 11/1949 | Heigis . | |
| 2,627,870 | 4/1945 | Grove et al. . | |
| 2,675,204 | 4/1954 | Johnson | 251/25 |
| 2,719,532 | 8/1952 | Grant, Jr. . | |
| 2,989,067 | 6/1961 | Perle | 137/613 X |
| 3,053,294 | 9/1962 | Anderson | 92/63 X |
| 3,151,628 | 10/1964 | Heckert . | |
| 3,192,782 | 7/1965 | Wantz . | |
| 3,245,583 | 4/1966 | Miller et al. . | |
| 3,269,411 | 8/1966 | Teston | 137/613 |
| 3,317,180 | 5/1967 | Dryden . | |
| 3,384,133 | 5/1968 | Gordon | 141/21 |
| 3,538,930 | 11/1970 | Kowaiski . | |
| 3,648,893 | 3/1972 | Whiting . | |
| 3,856,042 | 12/1974 | Fletcher et al. | 137/505.42 |
| 3,974,258 | 8/1976 | Poitevin et al. . | |
| 4,077,422 | 3/1978 | Brinkley et al. . | |
| 4,128,391 | 12/1978 | Braunstein . | |
| 4,263,939 | 4/1981 | Bird | 251/118 X |

(List continued on next page.)

FOREIGN PATENT DOCUMENTS

| | | | |
|---|---|---|---|
| 460949 | 11/1949 | Canada | 251/27 |
| 615812 | 3/1961 | Canada | 137/614.2 |
| 645205 | 5/1937 | Fed. Rep. of Germany . | |
| 887657 | 7/1953 | Fed. Rep. of Germany | 137/505.38 |
| 2155452 | 5/1973 | Fed. Rep. of Germany . | |
| 1085448 | 2/1955 | France | 137/505.42 |
| 2163837 | 7/1973 | France . | |
| 2176727 | 11/1973 | France . | |
| 882493 | 11/1961 | United Kingdom . | |
| 1052274 | 12/1966 | United Kingdom | 137/881 |
| 260855 | 5/1970 | U.S.S.R. | 137/505.38 |

*Primary Examiner*—A. Michael Chambers
*Assistant Examiner*—John C. Fox
*Attorney, Agent, or Firm*—Antonelli, Terry & Wands

[57] ABSTRACT

A cylinder valve for mounting on a high pressure gas cylinder for remotely controlling the flow of gas from the cylinder. The cylinder valve is resistant to hazardous gases and includes a fluid passage for conveying gas through the cylinder valve from an inlet for communicating with the high pressure gas cylinder to an outlet. A first valve is provided for opening and closing the fluid passage to control the flow of gas through the fluid passage. A pneumatically operated actuator is provided for operating the first valve in response to the application of an external control pressure to the actuator. A mechanism is provided to move the first valve and close the fluid passage in the event of loss of external control pressure to the actuator. A second valve is located downstream of the first valve in the vicinity of the outlet. The second valve is biased to close the fluid passage but is moved to open the passage in response to attachment of a connector to the outlet of the cylinder valve. A one-way restrictor is provided in the fluid passage between the second valve and the outlet for restricting the flow of gas flowing in the fluid passage in a direction of the outlet. A pressure safety device is also provided in fluid communication with the fluid passage of the cylinder valve for releasing gas pressure above a safe operating temperature and/or pressure.

29 Claims, 9 Drawing Figures

U.S. PATENT DOCUMENTS 4,265,270 5/1981 Satoh .............................. 137/505.39
4,271,863 6/1981 Bishop .......................... 251/149.6 X
4,314,584 2/1982 Sieglita .
4,324,269 4/1982 Baranowski, Jr. ......... 137/505.39 X
4,413,649 11/1983 Rodd et al. ................ 137/505.42 X
4,424,830 1/1984 Arnsperger et al. .
4,426,793 1/1984 Kubayama .
4,428,560 1/1984 Erdelsky .
4,462,424 7/1984 Genbauffe et al. .
4,493,434 1/1985 Beaujean et al. ....................... 222/3

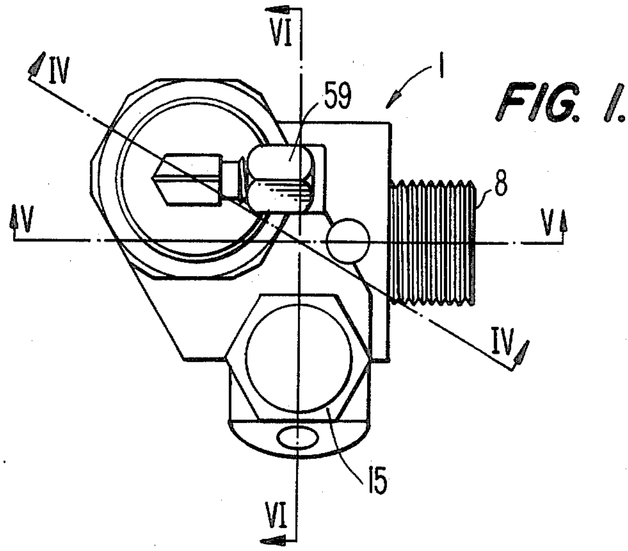
FIG. 1.
FIG. 2.
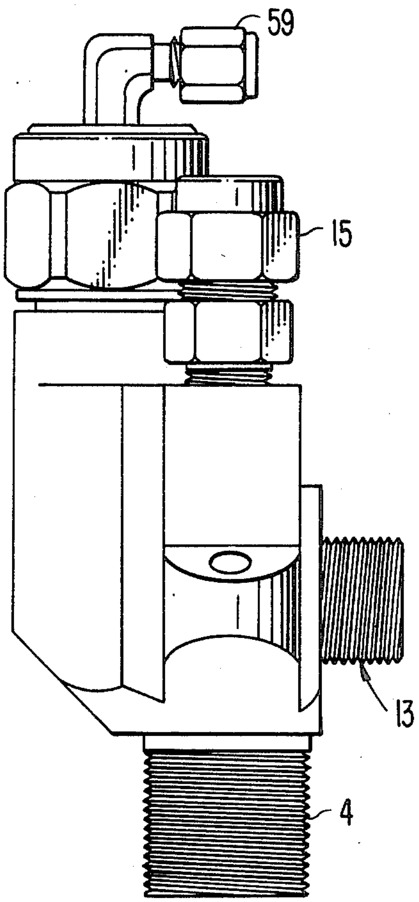
FIG. 3.
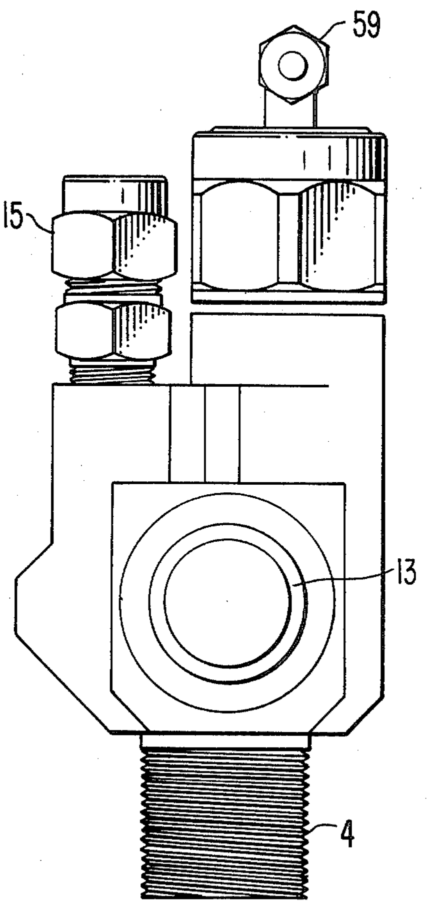

CYLINDER VALVE-REGULATOR

This application is a continuation of application Ser. No. 729,414, filed May 1, 1985, now abandoned.

BACKGROUND AND SUMMARY OF THE INVENTION

The present invention is directed to an improved cylinder valve regulator for mounting on a high pressure gas cylinder for controlling the flow of gas from the cylinder. More particularly, the invention relates to an improved cylinder valve regulator which can significantly contribute to the safe handling of hazardous gases such as those used extensively in the semiconductor industry.

A known cylinder valve for controlling the flow of gas from a high pressure gas cylinder is a manually operated cylinder valve. When the high pressure gas cylinders contain hazardous gases such as those used in the semiconductor industry, the gas cylinders are placed in a gas cabinet which is ventilated for safety in the event of leaks. One problem associated with the use of the known manually operated cylinder valve in such an application is that it requires the operator to reach inside the gas cabinet to actuate the valves. The ingress and egress from the gas cabinet is time consuming and possibly dangerous to the operator in the event of gas leaks. One proposed solution to this problem involves the provision of a remotely controlled device within the gas cabinet to rotate the knob on the manually operated cylinder valves in the same manner as the operator would rotate the valves by hand. However, the provision of such an additional remote control device is problematical in that it requires additional space within the gas cabinet and represents an additional expense. Further, the remotely controlled devices are not fail safe since the manually operated valves may remain open in the event of loss of power to the remote control devices as, for example during a thunderstorm or earthquake.

Thus, an object of the present invention is to provide a cylinder valve regulator which avoids the aforementioned problems associated with the known manually operated cylinder valve. More specifically, an object of the invention is to provide a cylinder valve regulator which enables the operator to actuate the cylinder valve regulator from outside the gas cabinet, without having to reach inside the cabinet, which cylinder valve regulator safely closes itself upon failure of a valve control signal as in a power failure, for example.

A further object of the present invention is to provide a cylinder valve regulator for mounting on a high pressure gas cylinder for controlling the flow of gas from the cylinder which significantly contributes to the safety of handling of hazardous gases such as those used extensively in the semiconductor industry by permitting the remote control of the cylinder valve regulator to be subordinated to other parameters such as sensed earthquakes to effect an automatic closure of the cylinder valve to prevent gas leaks and possible injury.

An additional object of the present invention is to provide a cylinder valve regulator which can be mounted on a high pressure gas cylinder as a substitute for an existing hand operated valve, the cylinder valve regulator of the invention having a physical configuration to fit within the existing safety cap of the gas cylinder and incorporating a safety pressure device according to the Compressed Gas Association specification (CGAS 1.1) and which cylinder valve regulator has an outlet fitting meeting the configuration requirements of the CGA specifications.

These and other objects of the invention are attained by the cylinder valve regulator of the invention which is adapted to be mounted on a high pressure gas cylinder as a substitute for a hand operated valve for controlling the flow of gas from the cylinder. The cylinder valve regulator comprises means for mounting the cylinder valve regulator on the high pressure gas cylinder, fluid passage means for conveying gas through the cylinder valve regulator from an inlet for communicating with the high pressure gas cylinder to an outlet, first valve means for opening and closing the fluid passage means to control the flow of gas through the fluid passage means, and fluid pressure operated actuator means for operating the first valve means in response to the application of an external control pressure to the actuator means. The use of an external source of a control fluid pressure permits the remote control of the cylinder valve regulator so that the operator does not have to reach inside a gas cabinet to actuate the cylinder valve regulator. The safety of the operator is further enhanced by an additional feature of the invention wherein means are provided in the cylinder valve regulator for causing the first valve means to close the fluid passage means upon loss of the external control pressure to the actuator means. That is, in the event of a power failure during an earthquake or other catastrophe, the operator's safety is ensured to the extent possible by closure of the fluid passage means in the cylinder valve.

Safety in handling of hazardous gases is also further enhanced by an additional feature of the invention that the cylinder valve regulator is physically configured to fit within an existing safety cap for the high pressure gas cylinder on which the cylinder valve is mounted. Further, in the preferred form of the cylinder valve regulator a pressure safety device according to the CGA specification (CGA S1.1) is provided in the cylinder valve in fluid communication with the fluid passage means. The pressure safety device operates to release gas pressure in the valve above a safe operating temperature and/or pressure.

According to a disclosed, preferred embodiment of the invention the cylinder valve regulator further comprises second valve means located downstream of the first valve means in the vicinity of the outlet for opening and closing the fluid passage means to control the flow of gas through the fluid passage means. Means are provided for yieldably biasing the second valve means toward a position to close the fluid passage means. Further, means are provided for moving the second valve means to a position to open the fluid passage means in response to attachment of a connector to the outlet. Because of this a hazardous gas cannot be accidentally discharged from the cylinder valve regulator outlet when its accompanying gas conduit has not been attached to the outlet of the cylinder valve regulator.

In the disclosed embodiment the fluid pressure operated actuator means of the cylinder valve regulator is a pneumatically operated actuator for opening the first valve means in response to the application of an external control pressure to the actuator. The means for causing the first valve means to close the fluid passage means upon loss of external control pressure yieldably biases the first valve means toward a position to close the fluid passage means so that upon loss of the external control pressure to the actuator the first valve means closes the fluid passage means. The pneumatically operated actuator and the means for yieldably biasing the first valve means constitute or operate jointly as a pressure regulator means in the disclosed embodiment for operating the first valve means so as to regulate the gas pressure in the fluid passage means downstream of the first valve means in response to the application of the external control pressure to the actuator while effecting the fail safe mode, that is, closing the fluid passage means, upon loss of the external control pressure to the actuator.

More specifically, the pneumatically operated actuator comprises a piston-cylinder unit to which the external control fluid pressure is applied. Means are provided for transmitting movement of a piston of the piston-cylinder unit to the first valve means for opening the first valve means. The means for transmitting movement of the piston to the first valve means includes a movable diaphragm defining a portion of the fluid passage means downstream of the first valve means, means outside of the fluid passage means for transmitting the movement of the piston to the diaphragm, and means inside of the fluid passage means for transmitting movement of the diaphragm to the first valve means for opening the first valve means. With this arrangement the diaphragm moves so as to balance the opposing forces thereon from, on the one hand, the piston-cylinder unit as a result of the control pressure thereto, and, on the other hand, the gas pressure on the diaphragm downstream of the first valve means which corresponds to the outlet gas pressure. Thus, the valve opening at the first valve means is controlled to create downstream a pressure determined by the force applied by the actuator. Stated another way, the outlet pressure is related to the value of the control pressure to the actuator.

A one-way restrictor means is provided in the fluid passage means downstream of the first valve means, particularly between the second valve means and the outlet, for restricting the flow of gas flowing in the fluid passage means in the direction of the outlet. The restrictor means does not interfere with the reverse flow during the filling operation. To assist in the filling operation, an adapter can be applied to the pneumatic actuator to provide an override manual actuation as may be needed at the filling plant.

The materials of the cylinder valve regulator which contact the gas from the high pressure gas cylinder are resistant to hazardous gases including ammonia, silane, dichlorosilane, hydrogen chloride, arsine and phosphine and back-up seal means are provided in the cylinder valve regulator to protect against diaphragm failure.

These and other objects, features and advantages of the present invention will become more apparent from the following description when taken in connection with the accompanying drawings which show, for purposes of illustration only, one embodiment in accordance with the present invention.

BRIEF DESCRIPTION OF THE DRAWINGS

FIG. 1 is a top view of a preferred embodiment of a cylinder valve regulator according to the invention;

FIG. 2 is a side elevational view of the cylinder valve regulator as seen from the lower side of the cylinder valve regulator as shown in FIG. 1;

FIG. 3 is a side elevational view of the cylinder valve regulator of FIG. 1 as seen from the right side of the cylinder valve regulator as shown in FIG. 1;

DETAILED DESCRIPTION OF THE DISCLOSED EMBODIMENT

Figure 8:
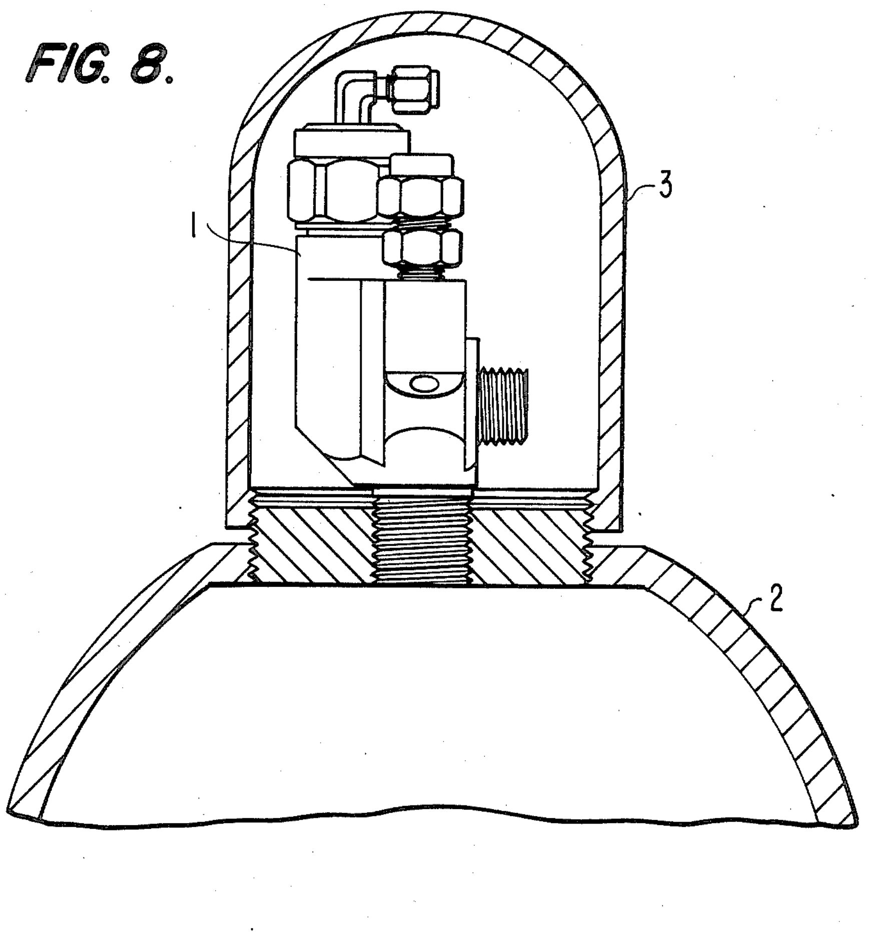
FIG. 8 is a side elevational view, partly in cross section, depicting the cylinder valve regulator of FIG. 1 mounted on a high pressure gas cylinder within an existing safety cap for the gas cylinder.

Referring now to the drawings, the cylinder valve regulator 1 of the invention is designed to mount directly on a high pressure gas cylinder 2, as a substitute for an existing hand wheel valve, and to fit within an existing protection or safety cap 3 as shown in FIG. 8. For example, the space within a typical safety cap is defined by a cylindrical envelope with a diameter of three inches and a height of 4.25 inches. The cylinder valve regulator of the invention is physically configured to fit within this safety cap. It is connected to the high pressure gas cylinder 2 by means of a threaded sleeve 4 depending from the lower portion of the cylinder valve as shown in FIGS. 2 through 4, 6 and 8. In the illustrated embodiment the cylinder valve regulator 1 is connected to the high pressure gas cylinder 2 by a $\frac{3}{4}$ National Gas Taper (NGT) thread formed on the threaded sleeve 4.

Figure 9:
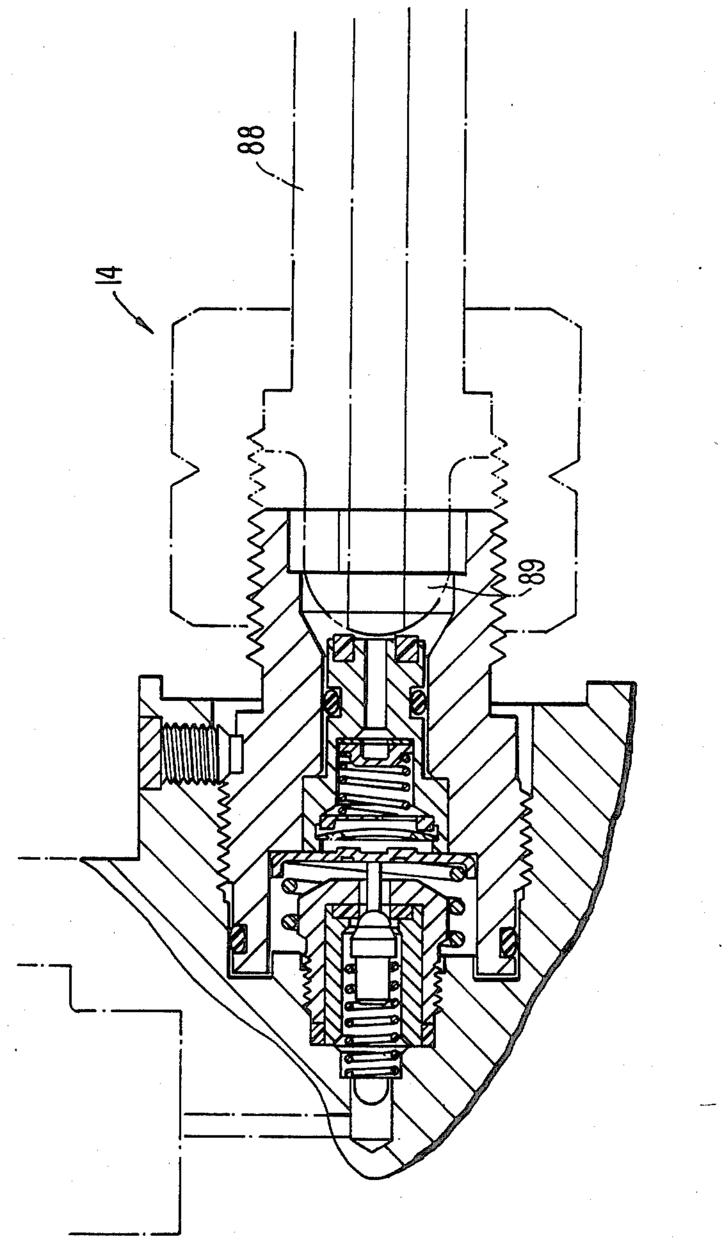
FIG. 9 is a cross-sectional view of the cylinder valve outlet, second valve means and restrictor similar to FIG. 5 and depicting in dashed lines a connector being attached to the outlet.

A fluid passage 5 is provided in the cylinder valve regulator for conveying gas through the cylinder valve regulator from an inlet 6 at the threaded sleeve 4 for communicating with the high pressure gas cylinder 2 to an outlet 7 of the cylinder valve regulator. The outlet 7 is defined by an outlet fitting 8 which is screwed into the cylinder valve regulator body 9 and locked in place by two retaining pins 10. The oulet fitting is sealed by a Teflon gasket 11, backed by a static O-ring seal 12. The outlet fitting is formed with an outlet thread 13 for attachment of a connector 14 to the outlet 7 of the cylinder valve regulator 1 in the manner illustrated in FIG. 9 of the drawings. The outlet fitting 8 meets the configuration requirements for a Compressed Gas Association (CGA) connection. For example, the outlet thread 13 can be one of the following according to CGA requirement:

| | |
|---|---|
| CGA 350 | .825 - 14NGOLH |
| CGA 330 | .825 - 14NGOLH |

-continued

| | |
|---|---|
| CGA 660 | 1.030 - 14NGORH |
| CGA 678 | 1.030 - 14NGOLH. |

Figure 6:
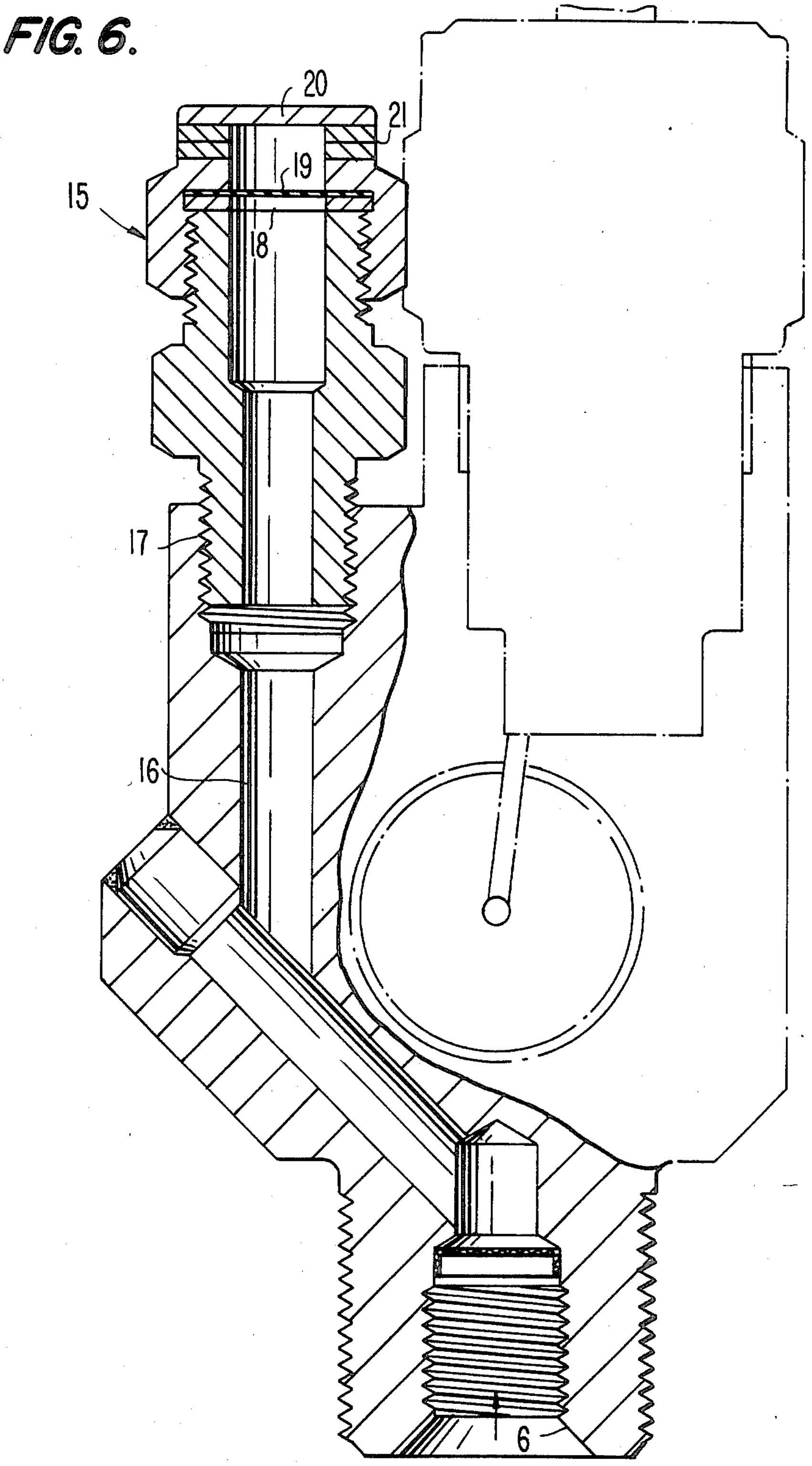
FIG. 6 is a cross-sectional view of the cylinder valve regulator of FIG. 1 taken along the line VI—VI and depicting the pressure safety device in communication with the fluid passage means of the cylinder valve regulator for releasing gas pressure above a safe operating temperature and/or pressure.

The cylinder valve regulator 1 further includes a pressure safety device 15 according to the CGA specification (CGA S1.1). More specifically, as shown in FIG. 6 the pressure safety device 15 is in fluid communication with the fluid passage 5 adjacent the inlet 6 by means of a fluid passage 16. The pressure safety device is attached to the valve regulator body 9 by a ¼ NPT thread 17 as shown in FIG. 6. Two types of safety devices are used, namely a burst disk 18 backed by a fusible alloy 19 and a cap 20 with a fusible alloy 21. For example, the safety device can be a burst disk (Inconel) with gasket (silver) and sealing cap (brass chromeplated) backed by a fusible alloy, rated 3360 psi at 165° F., or a stainless cap with alloy fusible at 165° F., in the case of ammonia service, for example.

A first valve 22 is provided in the cylinder valve regulator 1 for opening and closing the fluid passage 5 to control the flow of gas through the fluid passage. The first valve 22 is biased by a spring 23 against an annular Teflon seal 24 about an opening 25 of a cap 26 to normally close the passage 5. The cap 26 is threadedly connected to the valve regulator body 9 with a Teflon seal 27 interposed. A retainer 28 is positioned within the cap 26 to retain the seal 24 in position adjacent 25. A screen 29 is provided in the fluid passage 5 immediately upstream of the first valve 22 to protect the valve seat assembly against particulate contamination. A second screen 30 is provided in the passage 5 adjacent to the inlet 6.

Figure 4:
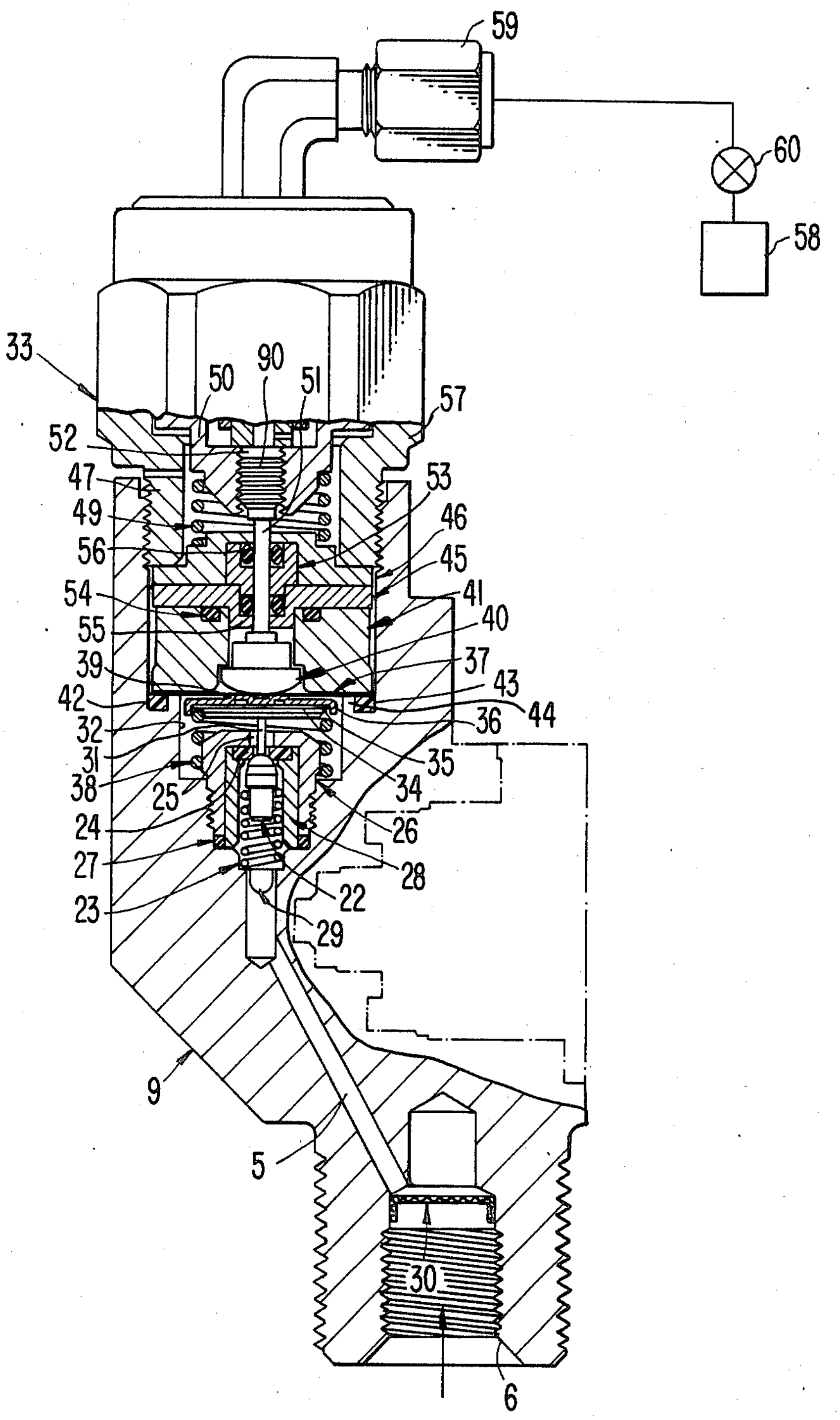
FIG. 4 is a cross-sectional view of the cylinder valve regulator of FIG. 1 taken along the line IV—IV and illustrating the cylinder valve regulator inlet, first valve means and the pneumatically operated actuator therefor.
Figure 5:
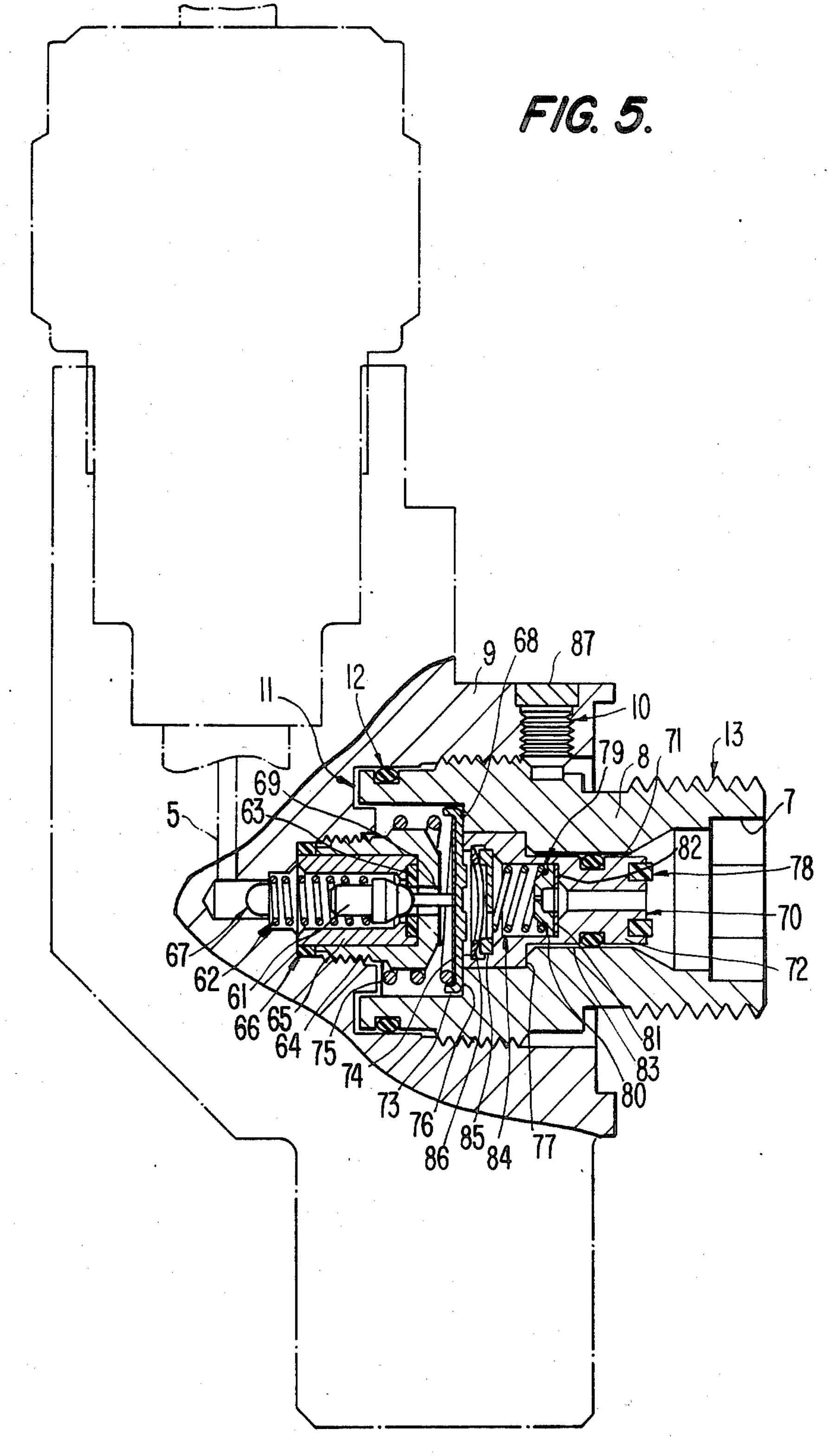
FIG. 5 is a cross-sectional view of the cylinder valve regulator of FIG. 1 taken along the line V—V and showing the outlet, the second valve means and one-way restrictor.

The valve 22 is provided with an elongated nose 31 on its upper end as shown in FIG. 4 which projects into an enlarged area 32 of the fluid passage 5 so that the valve 22 may be actuated by a pneumatically operated actuator generally designated by the reference numeral 33. Plates 34, 35 and 36 are positioned within the enlarged area 32 of the fluid passage 5 between the elongated nose 31 of the valve 22 and a movable metal diaphragm 37 defining the upper wall of the enlarged area 32 of the passage 5. The plates are biased upwardly in the enlarged area 32 against the metal diaphragm 37 by means of a spring 38 and also by the end of the elongated nose 31 of the valve 22 which engages the lower plate 34. The upper plate 36 is formed with an annular raised portion 39 for engaging the metal diaphragm 37 and cooperating with the lower surface of a button 40 arranged on the opposite side of the diaphragm for transmitting downward force from the pneumatically operated actuator 33 to the elongated nose 31 of valve 22 for opening the valve as discussed below.

The metal diaphragm 37 is supported on the cylinder valve body 9 about the enlarged area 32 by means of an annular cap 41 which presses the diaphragm against the upper edges of a shoulder 44 of the valve body surrounding the enlarged area. A Teflon seal 42 in an annular recess 43 about the shoulder 44 is compressed between the valve body 9 and the cap 41 to prevent escape of gases from the fluid passage 5 around the diaphragm. The cap 41 is urged downwardly in position against the diaphragm and shoulder 44 by means of caps 45 and 46, the lower end 47 of an actuator assembly 48 which is threadedly attached to the upper end of the recess 43 of the valve regulator body and by a spring 49 positioned between the upper surface of the cap 46 and the lower end of a piston 50 of the actuator assembly as illustrated in FIG. 4. A pin 51 is positioned adjacent a plug 90 threadedly attached in an opening 52 of the piston 50. The lower end of the pin is connected to the button 40 so that downwardly directed forces produced in the pneumatically operated actuator assembly 48 are transmitted to the metal diaphragm 37 and plates 34, 35 and 36 beneath the diaphragm to the valve 22 for opening the valve. A retainer 53 is positioned about the pin 51 and held in position by complementarily shaped openings formed in the caps 45 and 46. O-rings 54, 55 and 56 provide back-up seals between the several members of the pneumatically operated actuator 33 as shown in FIG. 4 to prevent leakage in the event of failure of the metal diaphragm 37.

Figure 7:
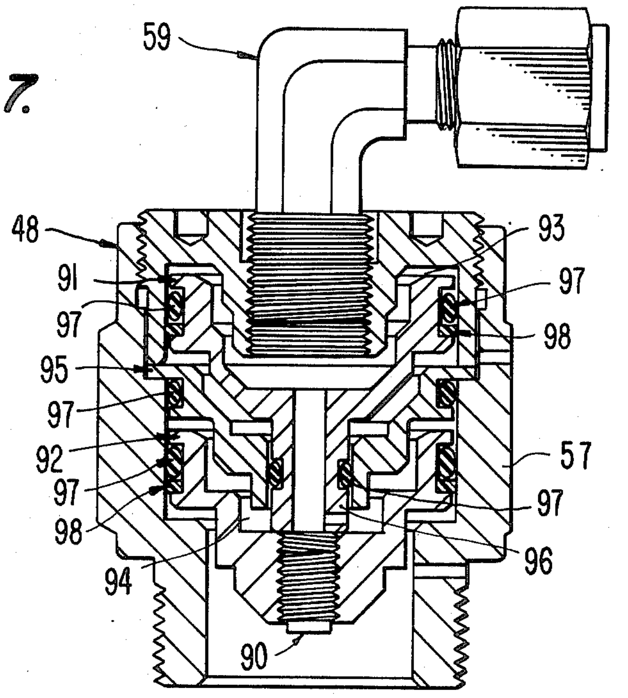
FIG. 7 is a cross-sectional view of a portion of the cylinder valve regulator of FIG. 1 taken along the line IV—IV and illustrating the pneumatically operated actuator.

The piston 50 of the actuator assembly 48 is actually a dual piston configuration as seen from FIG. 7 comprising a first piston 91 and second piston 92. The control pressure is applied to each piston which is located in its own chamber, 93 and 94, respectively. The pressure is applied to one side of each piston, while the other side is at atmospheric pressure. A spacer 95 separates the two chambers. The upper piston 91 has a sealed extension 96 protruding through the spacer. As a result of this configuration the force created by the upper piston is added to that created by the lower piston. In effect, the force created for opening the valve 22 is twice that which would be obtained by a single piston. O-rings 97 seal the actuator assembly in the manner illustrated in FIG. 7. Teflon rings 98 back-up the O-rings adjacent the pistons.

The dual piston 50 is normally maintained in an upper position by the spring 38. It moves downwardly within the stepped cylinder 57 of the actuator assembly to open the valve 22 in response to the introduction of pressurized air from an external, remote source of pressurized air 58 shown schematically in FIG. 4. The stepped cylinder 57 inherently limits the permissible downward travel of the dual piston 50 in the cylinder 57. The maximum downward travel of the diaphragm 37 which occurs with the maximum permissible downward movement of the dual piston 50 in the stepped cylinder 57 can inherently be adjusted by changing the extent to which the plug 90 is threaded into the opening 52 in the piston. A fitting 59 is incorporated in the cylinder valve to receive the control pressure through a ⅛ OD nylon tubing, for example. A valve 60 located in the line from the source 58 permits the remote actuation of the pneumatically operated actuator 33 so that the operator does not have to reach within a gas cabinet enclosing the high pressure cylinder. For refilling the gas cylinder the fitting 59 can be removed from the upper end of the actuator assembly 48 and a custom adapter, not shown, may be applied to the actuator assembly to provide an override manual actuation depressing the dual piston and opening the valve 22 as may be needed at the filling plant.

A second valve 61 is located in the fluid passage 5 in the vicinity of the outlet 7 of the cylinder valve regulator 1 for opening and closing the fluid passage to provide an additional control of the flow of gas through the fluid passage. When a connector 14 is not attached to the outlet 7, a spring 62 biases the valve 61 against a Teflon seal 63 to close the passage 5 at an opening through the seal which forms a portion of the fluid passage 5. The seal 63 is supported between a cap 64 threadedly attached to the valve body 9 and a retainer 65 positioned within the cap. The connection between the cap 64 and the valve body 9 is sealed by a Teflon seal 66. A screen 67 is positioned immediately up stream of the spring 62 and valve 61 to protect the valve seat assembly from particulate contamination. Like the first valve 22, the second valve 61 is provided with an elongated nose 68 which extends outwardly through an opening 69 in the cap 64 to enable the valve to be opened by a mechanism 70 upon attachment of a connector 14 to the outlet.

The mechanism 70 is positioned within a stepped bore 71 of the outlet fitting 8 and includes a sliding valve 72, plates 73 and 74 and a spring 75 acting between the valve regulator body 9 and the plates 73 and 74 to bias the plates and sliding valve against respective shoulders 76 and 77 of the stepped bore 71 so that the valve 61 makes sealing contact with the seal 63. When the nipple and nut of the CGA connector 14 are attached to the outlet the mechanism 70 opens the valve 61 as the sliding valve 72 is moved to the left. An annular Teflon seal 78 is provided in the outer free end of the sliding valve 72 to make sealing contact with the nipple of the connector before opening the fluid passage 5 by means of the second valve 61 to the downstream side of the first valve 22. Conversely, during the disconnect operation, the mechanism 70 closes the fluid passage by means of the second valve 61 before breaking the seal from the connector.

A one-way restrictor 79 is located in the fluid passage 5 between the second valve 61 and the outlet 7 for restricting the flow of gas flowing in the fluid passage in a direction toward the outlet 7. The restrictor is in the form of a metal button 80 having a relatively small centrally located bore therein with a diameter of 0.0135 inch, for example. The button 80 is normally biased against a shoulder 82 of the sliding valve 72 with a Teflon seal 83 interposed by means of a spring 84 acting between the button 80 and a washer-screen 85 which protects the restriction against particulate contamination. The washer-screen 85 and spring 84 are retained in position within the sliding valve 72 by a ring 86 which cooperates with a shoulder 87 of the sliding valve. The outer diameters of the button 80 and Teflon seal 83 are 0.010 inch less than the diameter of the adjacent annular portion of the step bore 71 of the sliding valve so that during a filling operation gas pressure will move the button and seal away from the shoulder 82 and permit the incoming gas to pass unrestricted into the gas cylinder. Thus, the restrictor 79 is effective in the out flow direction only and does not restrict the reverse flow during the filling operation. This makes it possible to fill the cylinder with gas which can flow at a greater rate than is possible during the flow of gas from the cylinder in the direction of the outlet 7.

The materials of construction of the cylinder valve regulator which contact the gas are resistant to hazardous gases such as ammonia, silane, dichlorosilane, hydrogen chloride, arsine and phosphine. In particular, the valve regulator body, outlet fitting and parts in contact with the process gas are preferably formed of 316 stainless steel. The metallic components of of the closures including the valves and springs and also the diaphragm 37 are also formed of 316 stainless steel. The seals of the closures are preferably fluoropolymer and the O-rings are preferably formed of Viton or Kalrez. The outlet fitting seals are preferably Teflon, Viton-or Kalrez. The pneumatically operated actuator is preferably formed of brass which has been electroless nickel plated and wherein the centrally located O-ring is Silicone and the back-up rings are Teflon as noted previously.

To operate the cylinder valve regulator 1 of the invention the valve regulator is mounted directly on a high pressure gas cylinder containing a hazardous gas at a pressure of up to 3,000 psi by means of the threaded sleeve 4 on the lower end of the valve. A connector 14 is attached to the outlet fitting 8 in the manner illustrated in FIG. 9 for distributing gas by way of a conduit 88 connected to the nipple 89 of the connector 14 once the valve 1 is actuated. Attachment of the connector 14 opens the second valve 61 through the movement of the sliding valve 72, plates 73 and 74 and valve 61 against the bias of the springs 62 and 75. The valve regulator 1 can then be operated to release gas from the gas cylinder 2 to the conduit 88 by actuating the valve 60 in the fluid pressure line extending from the external source of pressurized air 58 to the fitting 59 of the valve regulator 1. This applies pressurized air to the piston of the actuator assembly 48 causing the piston to move downwardly and open the first valve 22 to permit pressurized gas from the gas cylinder 2 to move downstream of the first valve 22 in the fluid passage 5. The control air pressure applied to the pneumatically operated actuator 33 is typically in the range of 0 to 100 psi but may go up to 150 psi. The cylinder valve regulator can be used to control the flow of gas from a cylinder containing a gas under a pressure up to 3,000 psi. The use of a control pressure of 80 psi, for example, will create an outlet pressure of approximately 500 psi at the outlet 7 of the cylinder valve regulator. At this pressure the restrictor 79 will limit the gas flow from the cylinder valve regulator outlet to 30 liters per minute. A change in the control pressure of 10 psi will result in a change in the outlet pressure of approximately 100 psi. That is, at gas cylinder pressures of from 500 psi to 3,000 psi the pneumatically operated actuator 33 in combination with the spring 23 operate the first valve 22 to regulate the gas pressure downstream of the first valve as a result of the balance of the forces from the control pressure on one side of the metal diaphragm 37 and the gas pressure in the fluid passage 5 downstream of the valve 22 acting on the other side of the diaphragm. If the pressure in the gas cylinder is lower than 500 psi, the outlet pressure will be equal to that in the cylinder. This would be the case for ammonia and dichlorosilane, for example. If the pressure in the gas cylinder is greater than 500 psi and it is desired to know the value of the pressure, a custom tool, not shown, may be applied to the actuator to override manually the pressure regulating function and create at the outlet a pressure equal to that in the cylinder, 600 psi for HCL, 2,000 psi for silane mix, arsine mix and phosphine mix, for example. At all times during the operation of the cylinder valve regulator, loss of the control pressure to the cylinder valve regulator for any reason will immediately result in a fail-safe mode where the valve 22 closes the fluid passage 5 under the action of the spring 23 thereby enhancing the safety of the hazardous gas distribution system of the invention.

While I have shown and described only one embodiment in accordance with the present invention, it is understood that the same is not limited thereto, but is susceptible to numerous changes and modifications as known to those skilled in the art. Therefore, I do not wish to be limited to the details shown and described herein, but intend to cover all such changes and modification as are encompassed by the scope of the appended claims.

I claim:

1. A cylinder valve-regulator for mounting directly on a high pressure gas cylinder for controlling the flow of gas from the cylinder comprising means for mounting the cylinder valve-regulator directly on the high pressure gas cylinder, fluid passage means for conveying gas through the cylinder valve-regulator from an inlet for communicating with the high pressure gas cylinder to an outlet, first valve means for opening and closing the fluid passage means to control the flow of gas through the fluid passage means, and pressure regulator means for operating said first valve means so as to regulate the gas pressure in the fluid passage means downstream of the first valve means as a function of the pressure of an external control fluid applied to the pressure regulator means and upon loss of said external control fluid passage to said pressure regulator means to close said fluid passage means, wherein said pressure regulator means includes a fluid pressure operated actuator for opening said first valve means in response to the application of said external control fluid pressure to said actuator, said actuator comprising a piston-cylinder unit to which said external control fliud pressure is applied and rigid means for transmitting movement of a piston of said piston-cylinder unit to the first valve means for opening said first valve means, wherein said rigid means for transmitting movement of the piston to the first valve means includes a movable diaphragm defining a portion of said fluid passage means downstream of said first valve means, rigid means outside of the fluid passage means for transmitting the movement of the piston to the diaphragm, and rigid means inside of the fluid passage means for transmitting movement of the diaphragm to the first valve means for opening said first valve means, said rigid means outside of said fluid passage means for transmitting movement including a pin which extends between said piston-cylinder unit and said diaphragm.

2. A cylinder valve regulator according to claim 1, wherein said pressure regulator means further includes means for yieldably biasing the first valve means toward a position to close the fluid passage means whereby upon loss of the external control fluid pressure to said actuator the first valve means closes said fluid passage means.

3. A cylinder valve regulator according to claim 1, further comprising second valve means located downstream of said first valve means in the vicinity of said outlet for opening and closing said fluid passage means to control the flow of gas through said fluid passage means, means yieldably biasing the second valve means toward a position to close the fluid passage means and means for moving the second valve means to a position to open the fluid passage means in response to the attachment of a connector to said outlet.

4. A cylinder valve regulator according to claim 3, wherein one-way restrictor means is provided in the fluid passage means between the second valve means and the outlet for restricting the flow of gas flowing in the fluid passage means in a direction of the outlet while no restricting the reverse flow of gas in the fluid passage means during a cylinder filling operation.

5. A cylinder valve regulator according to claim 3, wherein said means for moving the second valve means to a position to open the fluid passage means in response to the attachment of a connector to said outlet comprises a sliding valve which is moved in response to the attachment of a connector to the outlet, said sliding valve including a seal provided thereon for making sealing contact with the connector before the sliding valve moves the second valve means to a position to open the fluid passage means.

6. A cylinder valve regulator according to claim 5, wherein said means for moving the second valve means further comprises a plurality of plates located next to each other between said sliding valve and said second valve means.

7. A cylinder valve regulator according to claim 1, including a fitting for connecting the pressure regulator means with an external source of said control fluid pressure.

8. A cylinder valve regulator according to claim 1, wherein said cylinder valve is physically configured to fit within an existing safety cap for said gas cylinder.

9. A cylinder valve regulator according to claim 1, wherein the materials of said cylinder valve regulator which contact said gas are resistant to hazardous gases such as ammonia, silane, dichlorosilane, hydrogen chloride, arsine and phosphine.

10. A cylinder valve regulator according to claim 1, further comprising a pressure safety device in fluid communication with said fluid passage means, said pressure safety device releasing the gas pressure in said valve above a safe operating temperature and/or pressure.

11. A cylinder valve regulator according to claim 1, wherein said rigid means outside of the fluid passage means for transmitting movement includes sealing means to prevent flow of fluid to atmosphere in the event of failure of said diaphragm.

12. A cylinder valve regulator according to claim 1, wherein said rigid means outside of the fluid passage means for transmitting movement further includes a button connected to the end of said pin adjacent said diaphragm, said button contacting said diaphragm.

13. A cylinder valve regulator according to claim 1, wherein said rigid means inside of the fluid passage means for transmitting movement of the diaphragm includes a plurality of plates located next to each other adjacent said diaphragm.

14. A cylinder valve regulator according to claim 1, wherein a cylinder of said piston-cylinder unit has a stepped configuration which limits the movement of said piston therein in a direction for opening said first valve means, and wherein means are provided for adjusting the effective length of said rigid means for transmitting movement of said piston to said first valve means.

15. A cylinder valve-regulator for mounting directly on a high pressure gas cylinder for controlling the flow of gas from the cylinder, said cylinder valve-regulator having a physical configuration to fit within an existing safety cap for said high pressure gas cylinder and comprising fluid passage means for conveying gas through the cylinder valve from an inlet for communicating with the high pressure gas cylinder to an outlet, first valve means for opening and closing the fluid passage means to control the flow of gas through the fluid passage means, pressure regulator means comprising a pneumatically operated actuator having a piston which is moved in response to the application of an external control pressure to the actuator for regulating the gas pressure downstream of the first valve means as a function of the pressure of the external control pressure applied to the actuator, rigid means for transmitting the movement of said piston to said first valve means for opening said first valve means, means for yieldably biasing the first valve means toward a position to close the fluid passage means so that upon loss of the external control pressure to the actuator the first valve means closes the fluid passage means, second valve means located downstream of the first valve means in the vicinity of the outlet for opening and closing the fluid passage means to control the flow of gas through the fluid passage means, means yieldably biasing the second valve means toward a position to close the fluid passage means, means for moving the second valve means to a position to open the fluid passage means in response to attachment of a connector to the outlet, one-way restrictor means provided in the fluid passage means downstream of the first valve means for restricting the flow of gas flowing in the fluid passage means in a direction toward said outlet and for allowing the reverse flow of gas at a greater rate in the fluid passage means during a cylinder filling operation, and a pressure safety device in fluid communication with said fluid passage means, said pressure safety device releasing gas pressure above a safe operating temperature and/or pressure.

16. A cylinder valve regulator according to claim 15, wherein said restrictor means is located between the second valve means and the outlet.

17. A cylinder valve-regulator for mounting directly on a high pressure gas cylinder for controlling the flow of gas from the cylinder comprising means for mounting the cylinder valve-regulator directly on the high pressure gas cylinder, fluid passage means for conveying gas through the cylinder valve-regulator from an inlet or communicating with the high pressure gas cylinder to an outlet, first valve means for opening and closing the fluid passage means to control the flow of gas through the fluid passage means, pressure regulator means for operating said first valve means so as to regulate the gas pressure in the fluid passage means downstream of the first valve means as a function of the pressure of an external control fluid applied to the pressure regulator means and upon loss of said external control fluid pressure to said pressure regulator means to close said fluid passage means, said pressure regulator means including a fluid pressure operated actuator for opening said first valve means in response to the application of said external control fluid pressure to said actuator, and a one-way restrictor means provided in the fluid passage means downstream of the first valve means for restricting the flow of gas flowing in the fluid passage means in a direction of the outlet and for allowing the reverse flow of gas at a greater rate in the fluid passage means during a cylinder filling operation.

18. A cylinder valve-regulator for mounting directly on a high pressure gas cylinder for controlling the flow of gas from the cylinder comprising means for mounting the cylinder valve-regulator directly on the high pressure gas cylinder, fluid passage means for conveying gas through the cylinder valve-regulator from an inlet for communicating with the high pressure gas cylinder to an outlet, first valve means for opening and closing the fluid passage means to control the flow of gas through the fluid passage means, pressure regulator means for operating said first valve means so as to regulate the gas pressure in the fluid passage means downstream of the first valve means as a function of the pressure of an external control fluid pressure applied to the pressure regulator means and upon loss of said external control fluid pressure to said pressure regulator means to close said fluid passage means, second valve means located downstream of said first valve means in the vicinity of said outlet for opening and closing said fluid passage means to control the flow of gas through said fluid passage means, means yieldably biasing the second valve means toward a position to close the fluid passage means, means for moving the second valve means to a position to open the fluid passage means in response to the attachment of a connector to said outlet, said means for moving the second valve means to a position to open the fluid passage means in response to the attachment of a connector to said outlet comprising a sliding valve which is moved in response to the attachement of a connector to the outlet, said sliding valve including a seal provided thereon for making sealing contact with the connector before the sliding valve moves the second valve means to a position to open the fluid passage means, said fluid passage means extending through said sliding valve and restrictor means being provided in the fluid passage means in said sliding valve for restricting the flow of gas flowing in the fluid passage means in the direction of the outlet.

19. A cylinder valve regulator according to claim 18, wherein said pressure regulator means includes a fluid pressure operated acutator for opening said first valve means in response to the application of said external control fluid pressure to said actuator.

20. A cylinder valve-regulator according to claim 18, wherein said restrictor means is a one-way restrictor means for restricting the flow of gas flowing in the fluid passage means in a direction of the outlet and for allowing the reverse flow of gas at a greater rate in the fluid passage means during a cylinder filling operation.

21. A cylinder valve-regulator for mounting directly on a high pressure gas cylinder for controlling the flow of a gas from the cylinder comprising means for mounting the cylinder valve-regulator directly on the high pressure gas cylinder, fluid passage means for conveying gas through the cylinder valve from an inlet for communicating with the high pressure gas cylinder to an outlet, first valve means for opening and closing the fluid passage means to control the flow of gas through the fluid passage means, pressure regulator means for operating said first valve means so as to regulate the gas pressure in the fluid passage means downstream of the first valve means as a function of the pressure of an external control fluid pressure applied to the pressure regulator means and upon loss of said external control fluid pressure to said pressure regulator means to close said fluid passage means, said pressure regulator means including a fluid pressure operated actuator comprising a piston cylinder unit having a piston which is moved in response to the application of said external control fluid pressure to said actuator and means for transmitting movement of said piston to the first valve means for opening said first valve means, wherein said means for transmitting movement of the piston to the first valve means includes a movable diaphragm defining a portion of said fluid passage means downstream of said first valve means, means outside of the fluid passage means for transmitting the movement of the piston to the diaphragm, and means inside of the fluid passage means for transmitting movement of the diaphragm to the first valve means for opening said first valve means, and wherein back-up seal means is provided outside of said diaphragm about said means for transmitting the movement of the piston to the diaphragm to prevent leakage of gas from said cylinder valve in the event of failure of said diaphragm.

22. A cylinder valve regulator according to any one of claims 17, and 19, wherein said actuator comprises a piston-cylinder unit to which said external control fluid pressure is applied and means for transmitting movement of a piston of said piston-cylinder unit to the first valve means for opening said first valve means.

23. A cylinder valve regulator to claim 22, wherein said means for transmitting movement of the piston to the first valve means includes a movable diaphragm defining a portion of said fluid passage means downstream of said first valve means, means outside of the fluid passage means for transmitting the movement of the piston to the diaphragm, and means inside of the fluid passage means for transmitting movement of the diaphragm to the first valve means for opening said first valve means.

24. A cylinder valve regulator according to any one of claims 17, 18, and 21, wherein said pressure regulator means further includes means for yieldably biasing the first valve means toward a position to close the fluid passage means whereby upon loss of the external control fluid pressure to said actuator the first valve means closes said fluid passage means.

25. A cylinder regulator according to any one of claims 17 and 21, further comprising second valve means located downstream of said first valve means in the vicinity of said outlet for opening and closing said fluid passage means to control the flow of gas through said fluid passage means, means yieldably biasing the second valve means toward a position to close the fluid passage means and means for moving the second valve means to a position to open the fluid passage means in response to the attachment of the connector to said outlet.

26. A cylinder valve regulator according to any one of claims 17, 18, and 21, including a fitting for connecting the pressure regulator means with an external source of said control fluid pressure.

27. A cylinder valve regulator according to any one of claims 17, 18 and 21, wherein said cylinder valve is physically configured to fit with an existing safety cap for said gas cylinder.

28. A cylinder valve regulator according to any one of claims 17, 18, and 21, wherein the materials of said cylinder valve regulator which contact said gas are resistant to hazardous gases such as ammonia, silane, dichlorosilane, hydrogen chloride, arsine and phosphine.

29. A cylinder valve regulator according to any one of claims 17, 18, and 21, further comprising a pressure safety device in fluid communication with said fluid passage means, said pressure safety device releasing the gas pressure in said valve above a safe operating temperature and/or pressure.

* * * * *